United States Patent [19]

Wolf

[11] 3,720,927

[45] March 13, 1973

[54] SPEED INSENSITIVE READING AND WRITING APPARATUS FOR DIGITAL INFORMATION

[75] Inventor: Edgar Wolf, New Hyde Park, N.Y.

[73] Assignee: Redactron Corporation, Hauppauge, N.Y.

[22] Filed: Jan. 25, 1971

[21] Appl. No.: 109,521

[52] U.S. Cl. ....................340/174.1 H

[51] Int. Cl. ....................G11b 5/02

[58] Field of Search..340/174.1 A, 174.1 B, 174.1 G, 340/174.1 H

[56] References Cited

UNITED STATES PATENTS

| | | | |
|---|---|---|---|
| 3,573,766 | 4/1971 | Perkins, Jr. | 340/174.1 G |
| 3,281,806 | 10/1966 | Lawrance | 340/174.1 G |
| 3,356,934 | 12/1967 | Halfhill et al. | 340/174.1 G |
| 3,377,583 | 4/1968 | Sims, Jr. | 340/174.1 G |
| 3,482,228 | 12/1969 | Decker | 340/174.1 G |
| 3,508,228 | 4/1970 | Bishop | 340/174.1 G |
| 3,597,752 | 8/1971 | Eldert | 340/174.1 G |
| 3,609,684 | 9/1971 | Lipp | 340/174.1 G |

*Primary Examiner*—Vincent P. Canney
*Attorney*—Roberts & Cohen

[57] ABSTRACT

A digital data handling process in which 0's and 1's are represented or distinguished by the use of time ratios within respective and sequential periods in a signal. The periods are determined by sequential clock pulses and, between the clock pulses of each period, there occurs a transition from one voltage level to another. The transition divides the related period into two sections, the comparative durations of which establish the aforesaid ratio. The transitions and clock pulses correspond with the leading and trailing edges of rectangular or square-wave pulses which are magnetically recorded. For reading, the aforesaid durations control the charging and discharging of a capacitor or the counting up and down of a binary counter. The algebraic result of the charging and discharging or counting identifies a 1 or a 0. Reading and writing may be in the same or opposite directions.

13 Claims, 7 Drawing Figures

INVENTOR.
EDGAR WOLF
BY
Roberts & Cohen
ATTORNEYS

INVENTOR.
EDGAR WOLF
BY
Roberts & Cohen
ATTORNEYS

INVENTOR.
EDGAR WOLF
BY
Roberts & Cohen
ATTORNEYS

INVENTOR.
EDGAR WOLF

BY
Roberts & Cohen
ATTORNEYS

INVENTOR.
EDGAR WOLF
BY
Roberts & Cohen
ATTORNEYS

INVENTOR.
EDGAR WOLF
BY
Roberta A. Cohen
ATTORNEYS

SPEED INSENSITIVE READING AND WRITING APPARATUS FOR DIGITAL INFORMATION

BACKGROUND

1. Field of Invention

This invention relates to the manipulation and processing of digitally represented data and the like, and more particularly to reading and writing apparatus and techniques for recording information on and recovering information from record media.

2. Prior Art

The permanent or temporary storage of information constitutes one very important aspect of data manipulation and processing and, as a consequence of this importance, there have been many developments in this particular field. Some of these developments entail the use of magnetic recording techniques and are more specifically concerned with the use of magnetic tapes.

Various phase encoding systems have been employed relative to the reading and writing of information by the use of magnetic techniques. In general, it has been found that these known techniques are fairly intolerant of tape speed variation. In other words, known techniques require that read and write velocities be relatively well controlled in order to provide valid results and/or reproduction. However, good speed control leads to increased costs which result from the requirement of more sophisticated equipment.

To exemplify known techniques which are characterized by the need for good tape-speed control, reference is next made to a specific system of the prior art. In this known system 0's and 1's are represented in respective and sequential time periods as is conventional. More characteristically, however, this technique requires that the first half of each time period be positive or negative and that the second half be opposite to the first half depending on whether a 0 or 1 is to be represented. Recovery of data represented in the above fashion constitutes no problem if tape speed is constant since all that is required is to test for the value of the signal at some fixed time following the initiation of each time period. However, when tape speed varies, errors can occur due to the change in duration of the time periods relative to the aforesaid fixed time as a consequence of which improper readings may result.

Another known system is subject to the same type of error. In this second known system, 0's and 1's are distinguished by the presence or absence of a signal-level transition at the middle of each time period. For purposes of data recovery, differentiation is employed and a pulse is generated only when there is a signal-level transition. The presence or absence of such pulses is then checked out during a fixed time period, this checking out being subject to error due to tape speed changes as in the first example.

It is thus seen that known systems are characterized by the occurrence of some identifiable event during time periods in a signal and that data is recovered by checking for such occurrence within fixed absolute periods of time. It is generally well recognized and can be readily proved that variations in tape speed vary the signal periods which then have no fixed relationship to an absolute checking time thereby leading to the introduction of errors.

SUMMARY OF THE INVENTION

It is generally an object of the invention to provide improved data handling techniques and systems which are generally insensitive to variations of the duration of time periods in which information elements are represented.

It is a further general object of the invention to make the recording and recovery of digital information in a magnetic system or the functional equivalent thereof insensitive to variations of the speed of the record medium employed.

Other objects of the invention will appear hereinafter. However, to achieve the aforegoing objects as well as those subsequently disclosed, reliance is placed generally on a technique in accordance with which data items or elements (such as 1's or 0's in the well known digital system) are identified or distinguished by time ratios existing within sequential time periods in an information signal. As will become apparent hereinafter, the use of these time ratios avoids the need for reliance on inspection periods of fixed and/or absolute duration thereby avoiding the possibility that variations, for example, in magnetic tape speed can lead to errors.

The expression "time ratio" as employed herein may have various meanings but may be regarded generally as the ratio between two parts of a time period which cooperatively constitute, at least substantially, the whole of such time period and which are respectively defined by the occurrence of different levels of, for example, a voltage in a multi-level system. The time periods or cells which are referred to herein are generally defined by sequential clock pulses and are periods in which a single item of intelligence such as a bit (e.g., a 1 or a 0) will be represented.

Considering a two-level system by way of example, a 0 may be represented by the existence of one voltage level for the initial part of a time period and by the second voltage level for the remaining part of the time period, the initial part being less than one-half of the time period and the ratio of the initial part to the remaining part being less than unity. To represent a 1, said one voltage level is maintained for more than one-half of a time period so that the aforesaid ratio is greater than unity and thus, in accordance with the invention, 1's and 0's are distinguished by time ratios. In all cases, cells are defined between first and second transitions of a signal amplitude in a first direction and the type of bit is represented by a third transition in a second and opposite direction and its relation to the first and second transitions.

It will, of course, be understood that the aforegoing example is given by way of example and that multiple level systems other than two-level systems can be used and that unity is not to be the only critical limit which can be employed. Similarly, time ratios are merely exemplary of the characteristics which can be employed for identification purposes since period percentages and proportions and like analogous parameters are also useful. Still further, it will be understood that the invention is not limited to magnetic apparatus since the principles disclosed herein are applicable, for example, to photographic data storage, electrostatic data storage and so forth. Moreover, aside from application to data storage and the reading and writing operations incidental thereto, the invention will have application in various other systems in which there is need to encode information by the use of a plurality of distinguishable code elements.

Specific illustrative embodiments of the invention are set forth hereinbelow and are illustrated in the accompanying drawing.

DETAILED DESCRIPTION

Figure 1:
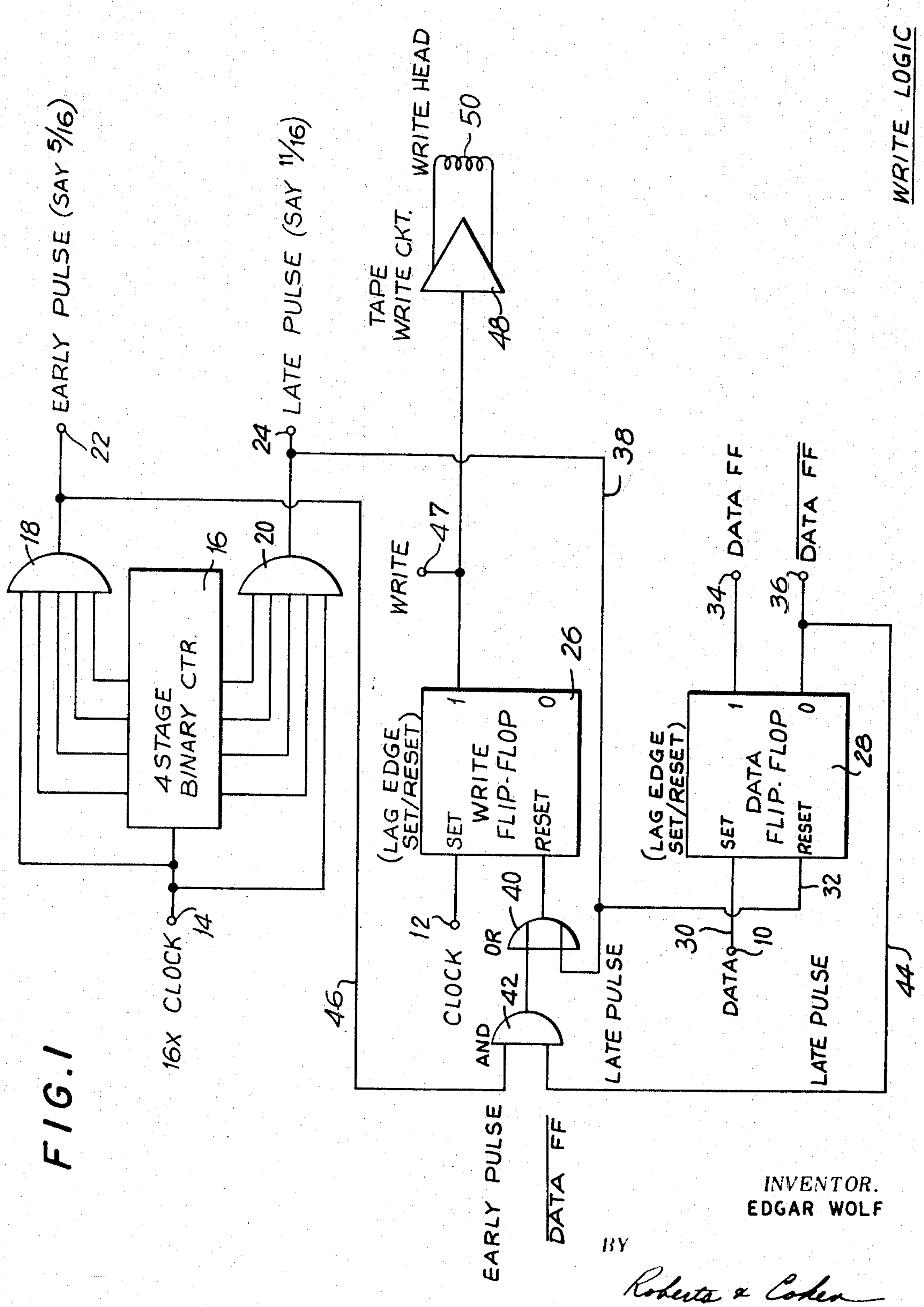
FIG. 1 is a logical diagram of a write or writing circuit employed in accordance with the invention.

The circuit shown in logical diagram form in FIG. 1 is a write circuit intended to record information on a magnetic tape or the like in accordance with the principles and techniques of the invention. There are three inputs to this circuit constituted by input terminals 10, 12 and 14, terminal 10 receiving data in the form of pulses and absences of pulses which in conventional manner represents digital information received, for example, from a computer or other data manipulating or handling apparatus. Input terminal 12 receives clock pulses and these clock pulses and the data received at terminal 10 have a common time basis so that there is synchronism between these signals. Input terminal 14 receives clock pulses at a frequency which is sixteen times that of the clock pulses received in terminal 12 and these higher frequency clock pulses are also synchronous with the main clock. The multiplication factor referred to is purely arbitrary and numerous other multiplication factors are acceptable, as will become obvious hereinafter.

Input terminal 14 is connected to a four-stage binary counter 16, the output terminals of which are connected to gates 18 and 20 in such a manner as to provide gated outputs which perform a relatively important function in the instant apparatus. Gates 18 and 20 may also be connected directly to input terminal 14.

Hereinabove, reference has been made to the fact that there is a transition between voltage levels during either an early portion of a time signal or of a time period in a signal or during a later portion of such time period or bit cell. As will be shown hereinafter, this transition is at least partly controlled by the gating outputs appearing at terminal 22 (early pulse). Further, this transition is in a direction which is opposite the two transitions which define the bit cell or terminal 24 (late pulse).

It has been stated hereinabove that sequential clock pulses determine time periods. Thus, the pulses fed into input terminal 12 determine respective time periods. These periods are divided into sixteen equal portions by the pulses fed to input terminal 14.

By appropriate and conventional connection of gates 18 and 20 to outputs of binary counter 16, it is possible to determine the time elapsed between an initial clock pulse and the early pulse appearing thereafter at terminal 22 and the late pulse appearing still later at terminal 24. For purposes of illustration, it will be assumed that the connections of the inputs of gate 18 are such that the early pulse appears at terminal 22 at five-sixteenths of a time period (i.e., clock-to-clock) following the initiating clock pulse relative thereto. Similarly it will be assumed that the late pulse appears at terminal 24 at eleven-sixteenths of a time period following the same clock pulse. It should be noted that although not absolutely essential to the invention, the arbitrarily selected times noted above occur respectively prior to and subsequent to the middle of a time period.

Also appearing in FIG. 1 is a write flip flop 26 and a data flip flop 28. Flip flop 28 has a set input line 30 and a reset input line 32 and output terminals 34 and 36. For purposes of simplification, the signals appearing at the output terminals will be conventionally designated as being either positive or negative, positive indicating a 1 and negative indicating a 0. Terminal 34 is positive when flip flop 28 is set when at the same time terminal 36 is negative, the polarities of these terminals being reversed when flip flop 28 is reset. Flip flop 28 is set when an input pulse indicating a 1 is received via terminal 10. Flip flop 28 is reset when a late pulse is received from terminal 24 via line 38.

The set terminal of flip flop 26 is connected to input terminal 12 by means of which clock pulses are received. The reset terminal of flip flop 26 is connected to an OR gate 40, the inputs to which are the late pulse originating at terminal 24 and the output signal received from an AND gate 42. Gate 42 has two input terminals, one of which is connected to terminal 36 of flip flop 28 via line 44 and the other of which is connected to early pulse terminal 22 via line 46. Flip flops 26 and 28 are preferably lag edge set/reset flip flops.

The output terminal of flip flop 26 produces a write signal appearing, for example, at terminal 47. This terminal is connected to a write amplifier 28 which is connected to a write head 50.

From what has been stated hereinabove, it can be seen that data is presented together with clock pulses in such a manner that each clock pulse sets the write flip flop 26. Each data pulse sets the data flip flop 28. The binary counter 16 generates an early pulse and a late pulse each related to the same clock pulse. If the data flip flop 28 has been set, the early pulse is blocked at gate 42 and resetting of flip flop 26 is then accomplished by the late pulse which passes from terminal 24 through OR gate 40 to the reset terminal of flip flop 26.

If the data flip flop 28 is not set, as would occur when a 0 (absence of a pulse) is received at terminal 10, the signal at terminal 36 is positive and gate 42 is primed to pass the early pulse via line 46 when it arrives.

Figure 2:
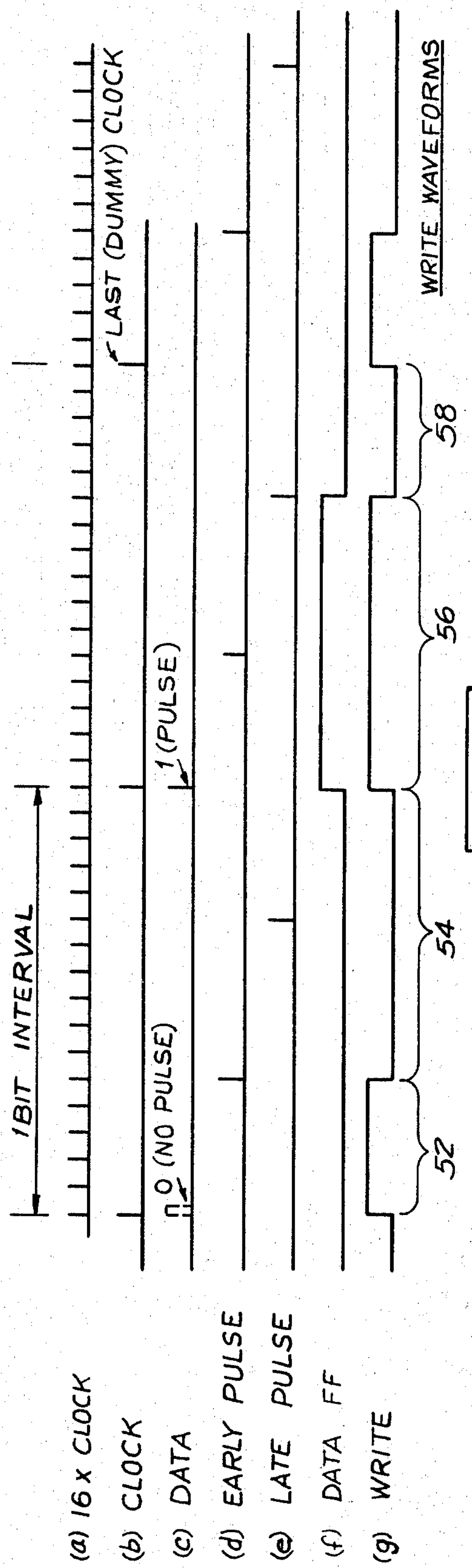
FIG. 2 is a signal chart of signals appearing in the circuit of FIG. 1.

Reference is next made to the signal chart of FIG. 2. Therein at (a) is indicated a sequence of 16 X clock pulses, a one bit interval or time period being indicated with respect thereto. The corresponding clock pulses are indicated at (b), with a final or dummy clock pulse being indicated at the end of the sequence. It will be assumed that the dummy clock pulse is supplied by the preceeding circuitry (not shown) and the purpose of dummy clock pulse will be to delineate the end of the information signal.

A data signal is indicated by way of example at (c), this consisting of a simple exemplifying signal constituted by a 0 (no pulse) and a 1 (pulse) in sequence.

The signals appearing at (a), (b) and (c) are respectively those signals fed into terminals 14, 12 and 10. At (b) is indicated the early pulse sequence or, in other words, those pulses appearing at terminal 22. It will be noted that these pulses appear simultaneously with the fifth 16 X clock pulses. Following the first clock pulse is a one part interval or time period.

The late pulse signal is indicated at (e), these pulses appearing simultaneously with the eleventh 16 X clock pulses following the initial clock pulse.

This is consistent with the arbitrarily selected example noted hereinabove, in accordance with which the early pulse appears at five-sixteenths of a time period and the late pulse appears at eleven-sixteenths thereof.

In accordance with the operation of the circuit described with reference to FIG. 1, the output of flip flop 28 appears at (f), this flip flop being set by a data pulse (see signal (c) ) and being reset by the next sequential late pulse received via line 38 from terminal 24.

The output of write flip flop 26 appears at (g), this flip flop being during each time period set by the initial clock pulse of that period and being reset by the late pulse when the data item is a 1 and by the early pulse when the data item is a 0. Thus, examining the output of flip flop 26 at (g) and the corresponding data signal at (c), it is seen that the output of flip flop 26 remains at the upper level for less than half of the first time period during which the data item is a 0, and for more than half of the second time period during which the data item is a 1. The last rectangular or square wave pulse in the write signal is a result of the dummy clock pulse and the fact that no further data (which is equivalent to a 0) is being received via terminal 10.

It should now be noted that portion 52 of the first time period is substantially less than remaining portion 54 thereof and that it may be observed that the ratio of portion 52 to portion 54 is less than one or, in other words, the portion 52 is less than 50 percent of the associated time period. It should further be noted that portion 56, which is the initial portion of the second time period, is substantially greater than remaining portion 58 of the second time period or, in other words, that the ratio of portion 56 to portion 58 is greater than one, or that portion 56 is more than fifty percent of the second time period.

Figure 3:
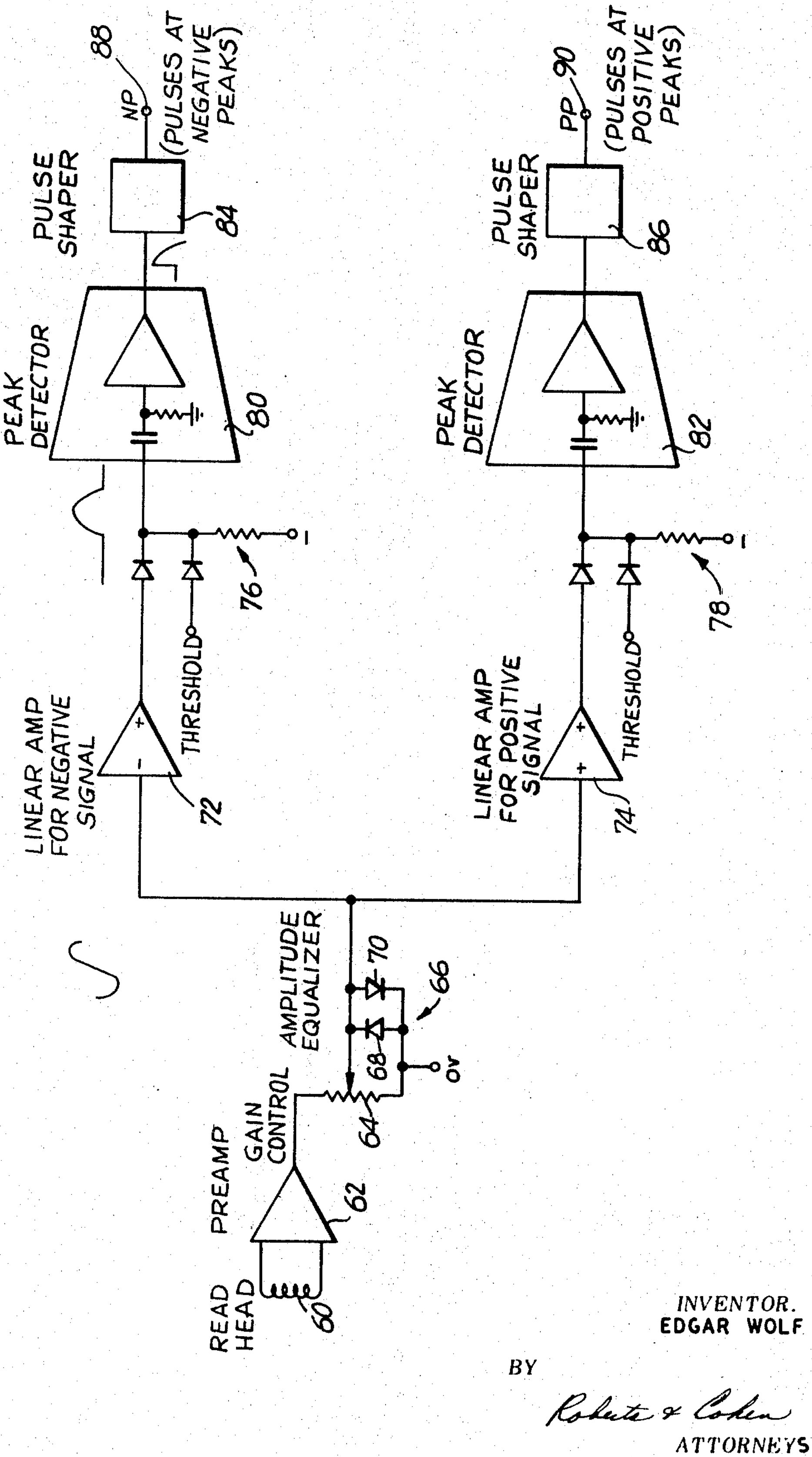
FIG. 3 is a partly logical, partly schematic diagram of a read or reading circuit employed in conjunction with the write circuit of FIG. 1.

The signal indicated in FIG. 2 at (g) is that signal which is magnetically recorded on a magnetic tape passing adjacent head 50 in FIG. 1. FIG. 3 illustrates a read circuit which is the first part of a circuit arrangement intending to recover data which has been magnetically stored on the aforesaid tape.

In FIG. 3 appears a read head 60 connected to a preamplifier 62 feeding into a gain control potentiometer 64 to which is connected an amplitude equalizer 66 consisting of inverted diodes 68 and 70. Circuit 66 feeds into two linear amplifiers 72 and 74, amplifier 72 performing an inverting function, but amplifier 74 being a non-inverting amplifier. Connected to the output of these amplifiers are threshold establishing circuits 76 and 78, following which are connected peak detectors 80 and 82. Pulse shapers 84 and 86 receive the outputs of peak detectors 80 and 82 and produce NP pulses and PP pulses at output terminals 88 and 90 respectively.

Figure 4:
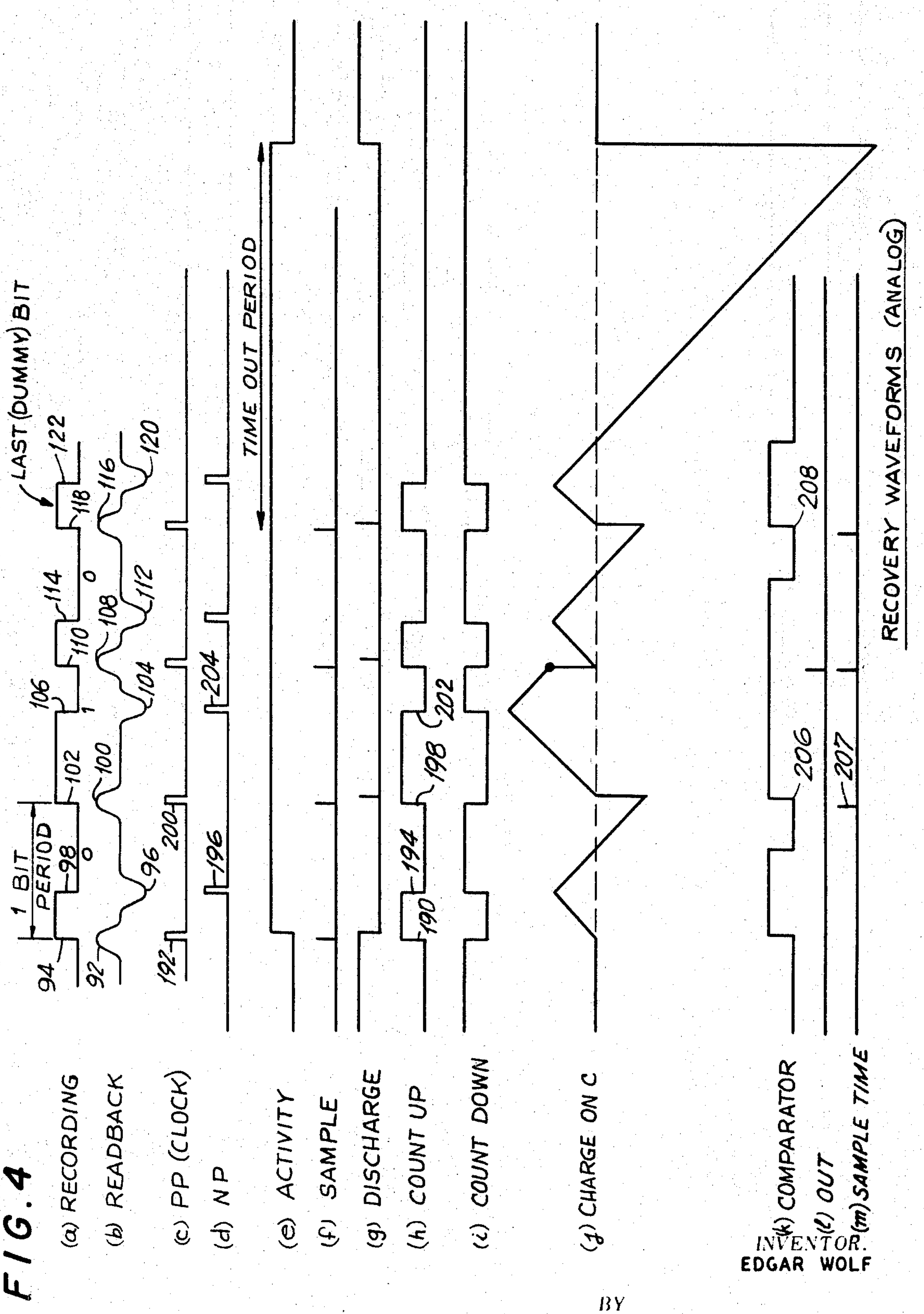
FIG. 4 is a chart of signals, some of which appear in the circuit of FIG. 3 and some of which appear in the circuit of FIG. 5.

In FIG. 4 at (a) – (d) appear signals relating to the read circuit of FIG. 3, which signals do not appear in FIG. 3. At (a) appears a data signal previously recorded on the magnetic tape. This signal corresponds to the signal at g in FIG. 2, but has been extended to include a further 0 0-1-0-dummy so that the signal is constituted by 0-1-0-bit. At (b) in FIG. 4 appears the waveform developed in reading head 60 as the tape-bearing information signal is moved past the head. Thus, it will be seen that there is a positive peak 92 corresponding to leading edge 94 and a negative peak 96 corresponding to trailing edge 98 during the first time period with a positive peak 100 corresponding to leading edge 102 and a negative peak 104 corresponding to trailing edge 106 in the second time period. In the third time period positive peak 108 corresponds to leading edge 110 and negative peak 112 corresponds to trailing edge 114. Finally, with respect to the dummy bit, positive peak 116 corresponds to the leading edge 118, whereas a negative peak 120 corresponds to trailing edge 122.

Examination of the circuit in FIG. 3 reveals the PP pulses as shown in signal (c) are generated in correspondence with positive peaks 92, 100, 108 and 116. The PP pulses are thus appearing at terminal 90. The NP pulses appearing at terminal 88 and illustrated as signals (d) are pulses corresponding to negative pulses 96, 104, 112 and 120.

Figure 5:
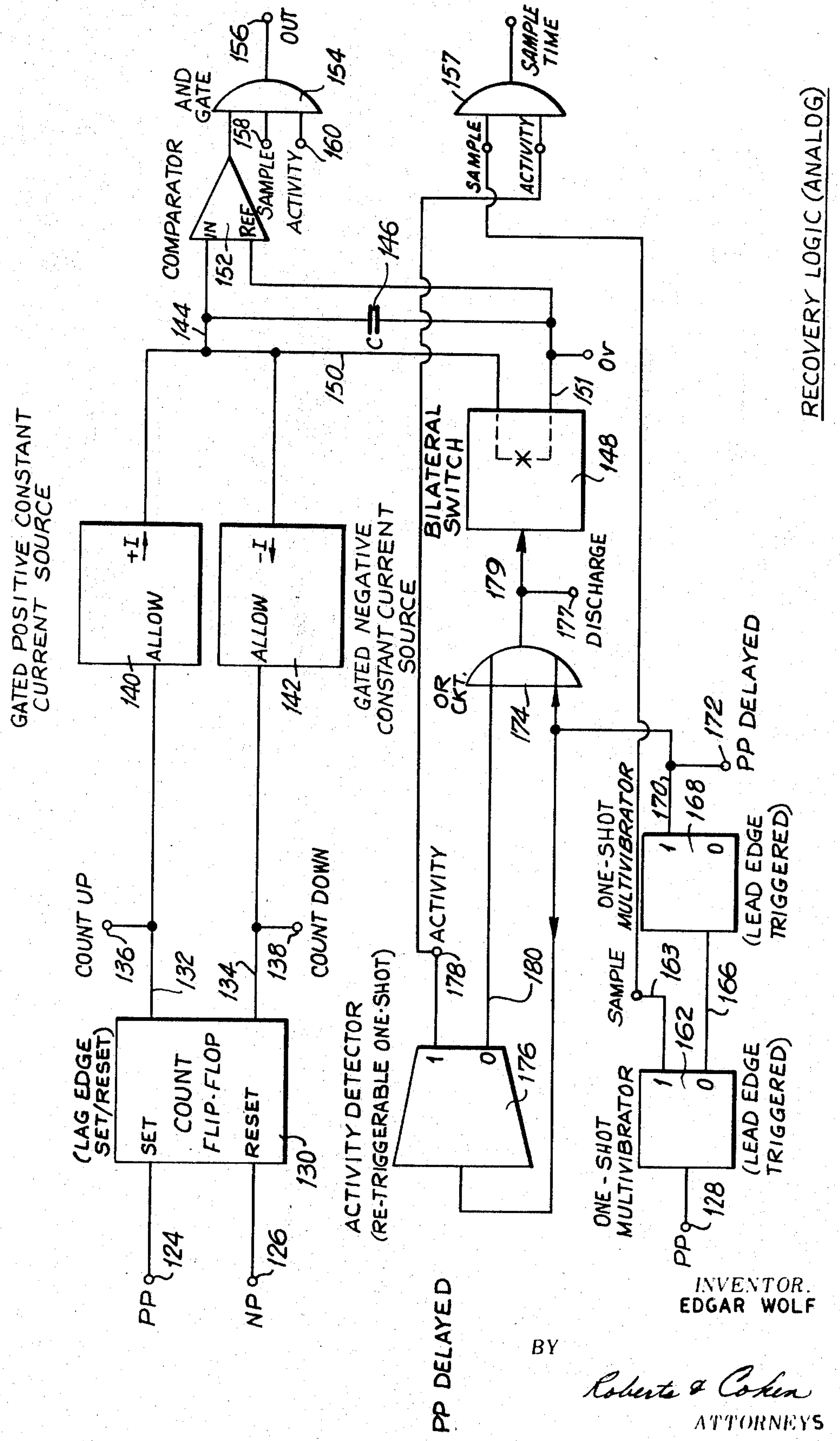
FIG. 5 is a logical diagram of a recovery circuit operating in conjunction with the read circuit of FIG. 3.

The remainder of the recovery circuits (for the analog-digital hybrid implementation) appear in FIG. 5, wherein PP and NP pulses are received via terminals 124, 126 and 128. Terminals 124 and 126 are connected to a count flip-flop 130 having the conventional set and reset terminals and providing output signals on lines 132 and 134. Terminal 136 connected to line 132 is a count up (accumulate) terminal, whereas terminal 138 connected to line 134 is a count down (deaccumulate) terminal. The signal appearing on line 132 controls a gated positive constant current source 140. The signal appearing on line 134 controls a gated negative constant current source 142. The outputs of these current sources are connected via line 144 to one side of a capacitor 146, which is also connected to one side of a bilateral switch 148 via line 150. The other side of capacitor 146 is returned to ground (0 v) and is tied to the other side of the bilateral switch 148 via line 151. The signal appearing across capacitor 146 is fed to a comparator 152 whose output is fed into a gate 154 having an output terminal 156 at which will appear the output data. Other inputs to gate 154 are a sample signal received via terminal 158 and an activity signal received via terminal 160. The generation of these signals will be explained hereinafter.

Also included in the circuits of FIG. 5 is a one shot multivibrator 162, the positive output of which appears at terminal 164 and constitutes the sample signal. The negative output terminal one shot multivibrator 162 is fed via line 166 to a one shot multivibrator 168. Both multivibrators 162 and 168 may be considered as lead edge triggered circuits. Because multivibrator 168 is driven by the negative output of multivibrator 162, the output pulses of multivibrator 168 follow at the lagging edge of those of multivibrator 122. The output of circuit 168 appears on line 170 and at terminal 172. This signal is designated as PP delayed since it is a very short duration pulse initiated by a PP pulse received via terminal 128 but is slightly delayed with respect thereto. PP delayed is fed via line 170 to an OR gate 174 and as well to an activity detector 176, the positive output of which appears at terminal 178 and is the activity signal referred to hereinabove. The negative output terminal of activity detector 176, which is a retriggerable one shot multivibrator, is fed via line 180 to OR gate 174, whose output terminal 177 carries a signal known as the discharge signal which is fed via line 179 as a control signal to bilateral switch 148.

With respect to the circuitry illustrated in FIG. 5, each PP pulse received sets the count flip flop to count up and each NP pulse resets flip flop 130 to count down. Moreover, each PP pulse generates a sample pulse at terminal 164 by operation of circuit 162, the negative sample signal passing along line 166 causing a PP delayed pulse to be generated on line 170 and at terminal 172. Both the sample and PP delayed pulses are very short pulses, the duration of which depend upon the internal design of circuits 162 and 168. These durations are selected to be short in comparison with the intervals between PP and NP pulses and the intervals between NP and PP pulses.

The activity detector 176 monitors the PP delayed pulses and the retriggerable one shot circuit which constitutes this activity detector is essentially a timer which runs down, but which is regenerated by successive PP delayed pulses as long as they occur. However, after a sufficiently long period of absence of PP pulses and therefore PP delayed pulses (i.e., longer than the furthest apart PP pulses plus a safety margin), the activity signal goes off.

The negative activity signal and the PP delayed signal pass through OR gate 174 to form the discharge signal at terminal 176. This signal is therefore present whenever activity is off or during the relatively short PP delayed pulses. The discharge signal at terminal 176 closes bilateral switch 148, thus bringing the charge across capacitor 146 to 0 irrespective of what the current sources 140 or 142 are doing.

When the first PP pulse comes in, flip flop 130 is set at the lag edge of this PP pulse and the bilateral switch is opened due to the absence of a discharge signal. Current source 140 controlled by the signal on line 132 allows positive current to flow into the capacitor thereby charging the same up to a voltage proportional to the tine during which count is up on. When an NP pulse arrives it shuts off the current source 140 and turns on the negative current source 142. This allows negative current to flow into capacitor 146 thereby discharging the capacitor by a voltage proportional to the time during which count down at terminal 38 is on.

The arrival of the next PP pulse causes a sample signal to appear at terminal 164 at which time, due to the presence of an activity signal gate 154, it samples the output of comparator 152. If the voltage across capacitor 146 is greater than 0, which signifies that the charging time is greater than the discharging time, a positive signal indicating a 1 appears at output terminal 156. If the voltage across capacitor 146 is equal to or less than 0, no pulse appears at terminal 156 at sample time indicating a 0. Sample time 207 is formed at AND gate 157 by gating together sample signal 163 and activity signal 178 to inform the output logic of legitimate time to sample output 156. This is to know when to report 0 legitimately.

After this sampling, a discharge signal is caused by the following PP delayed pulse. This restores the charge on capacitor 146 back to its original or no voltage state.

The activity signal which is not yet up in the first PP pulse prevents any reporting or sampling at the first PP pulse. The last real data pulse is reported by the recorded dummy clock pulse. In the dummy clock pulse, a last but meaningless cycle is initiated. Because no PP pulse follows before activity is turned off, no output is reported. Absence of the activity signal again causes a discharge signal which provides the normal state of capacitor 146 when there is no signal to be read.

Referring once again to FIG. 4, it is seen that the various signals referred to hereinabove appear at (e) – (m). The activity signal generated in circuit 176 is illustrated at (e). It is turned on 1 a short time following the occurrence of the first PP pulse (see signal (e)). It continues as long as PP pulses and therefore PP delayed pulses are received or generated and terminates at some time thereafter. The sample pulses are shown in signal (f), these corresponding timewise to the PP pulses received by circuit 162 via terminal 128, the sample pulses, however, being shorter than the PP pulses.

The discharge signal at terminal 176 is illustrated as signal (g), this turning negative due to the signal on line 180, but being pairs of PP and positive in the form of small pulses corresponding to the PP delayed pulses (not shown) at terminal 172. The count up and count down signals are shown respectively in the form of signals (h) and (i). Referring to signal (h) by way of example, the leading edge 190 corresponds to PP pulse 192, whereas the trailing edge 194 corresponds to NP pulses 196 in the first time period. In the second time period, it is seen that leading edge 198 corresponds to PP pulses 200, whereas trailing edge 202 corresponds to NP pulse 204. It will thus be seen that the duration of time during which the upper voltage magnitude appears in signal (h) during the initial portion of a time period is delineated between pairsof PPand NP pulses respectively. The closer the NP pulse is to the preceding PP pulse, the shorter the duration of time that the upper voltage magnitude appears. The longer the time between the PP pulse and its following NP pulse, the longer is the duration of time of the higher voltage magnitude.

Since court up causes capacitor 146 to be charged and count down causes the capacitor to be discharged, the charge on capacitor 146 takes the form indicated by signal (j). Thus, as long as count up is positive, the charge on capacitor (c) is linearly increasing, whereas when count down is positive the charge on capacitor 146 is linearly becoming more negative (with a slope of equal amplitude and opposite sign).

The output signal of comparator 152 appears at (k), wherein it is seen that the comparator generates the higher voltage magnitude when the charge on capacitor 146 is positive and the lower voltage magnitude when the charge on capacitor 146 is negative. Finally, the output signal at terminal 156 is indicated in the form of signal (1) where, under the control of the sample and activity signals it is seen that a positive output pulse indicating a 1 is generated when the comparator output signal is positive during a sample signal (signal (m) tells when to sample the output).

In the aforegoing description and with reference to the signals appearing in FIG. 4, it appears that the sample and comparator signals may have simultaneous existence, for example, as indicated at 206, 208, thereby rendering the determination of output signals somewhat difficult. However, it will be realized that the discharge of capacitor 146 is somewhat delayed from the sample pulse due to the lagging of the PP delayed pulses as a result of which this difficulty is avoided. Thus, the rising edges appearing at 206 and 208 are somewhat delayed in respect of the corresponding sample pulses to permit the lower voltage magnitude to be detected at that point.

With respect to the embodiment of the invention illustrated in FIG. 5, it is seen that there is a linear charging and discharging of capacitor 146. This is designated as the analog embodiment of the invention. It is possible, however, to replace the capacitor by a counter to form a digital embodiment of the invention as next described with reference to FIGS. 6 and 7.

Figure 6:
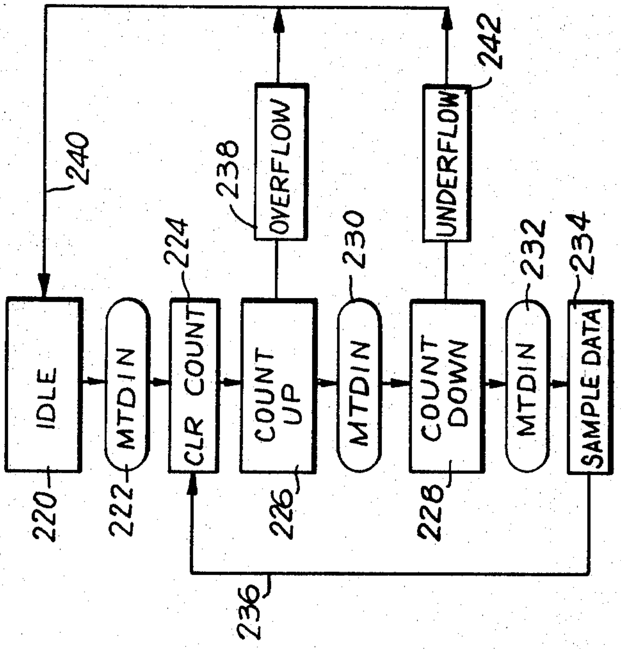
FIG. 6 is a flow diagram of a variation of the circuit illustrated in FIG. 5.

The flow chart of FIG. 6 indicates that the digital embodiment of the invention has an idle period 220 followed by MTDIN (magnetic tape data in) indicated at 222, in turn followed by a clear counter period indicated at 224. Count up (accumulate) and count down (deaccumulate) activities are indicated at 226 and 228 respectively, the continued flow of data being indicated at 230 and 232. A sample data operation is indicated at 234, a feed back to clear the counter being indicated at 236. The count up counter is checked to overflow as indicated at 238 so that should the count in the count up counter exceed the capacity of the counter, a signal is generated on line 240 to reset the circuitry to idle state. Similarly, underflow is indicated at 242 so that if the capacity of the count down counter is exceeded, a signal can be transmitted via line 240 to reset the system to idle.

The circuitry illustrated in FIG. 7 includes several symbols, examples of which will next be described to facilitate an understanding of the overall logical diagram. Reference is first made to flip flop 250 having D and C inputs and two outputs. A further input is indicated at the bottom of the flip flop at B. The outputs of the flip flop are conventional such that positive and negative outputs are provided in the upper and lower outputs respectively when the flip flop is set and negative and positive outputs are respectively provided at the upper and lower output terminals when the flip flop is reset. The input received at D is strobed into the flip flop at the lead edge of an input pulse received at input terminal C. When the input at the bottom of the flip flop, or in other words, at B, becomes negative, the flip flop is cleared. If there is an input at the top of the flip flop (hereinafter indicated as T), the flip flop is set.

Gates, such as the gate 252, are equivalent to an AND gate and an inverting amplifier in series. The gate 252 and other such gates will be referred to as NAND gates. Amplifiers followed by a small circle, such as indicated at 254, are inverters.

Figure 7:
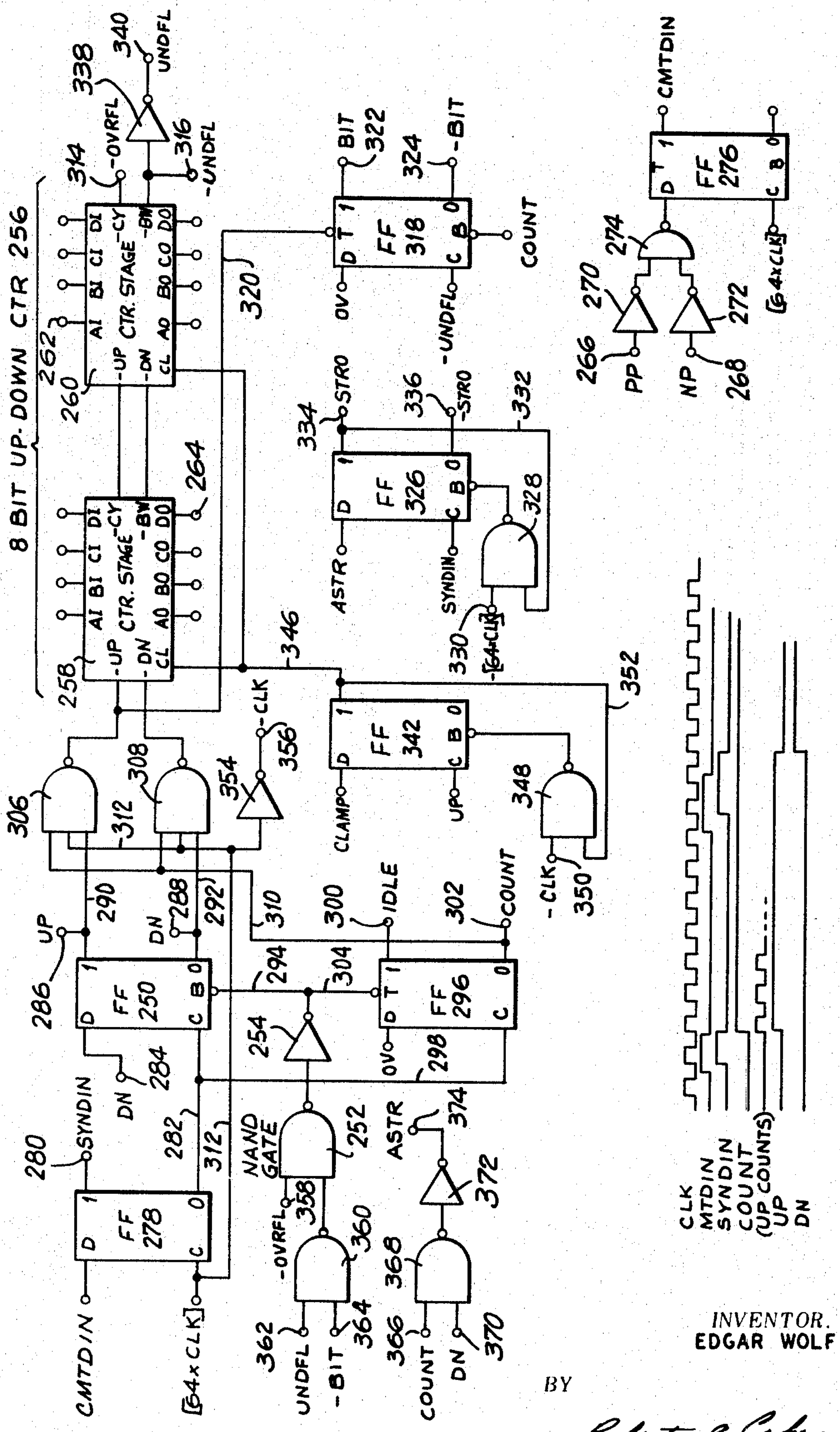
FIG. 7 is a logical diagram of a circuit based on the flow chart of FIG. 6.

In addition to the aforesaid elements, there is included in the circuitry of FIG. 7 an eight-bit up-down counter 256 consisting of counter stage 258 and counter stage 260. The output of terminals of the counter stages are those appearing at the bottom at 264. There are also signals indicated at up and down, whereat the signals are received which control whether the counter adds or subtracts in response to incoming signals. A clear signal is received at terminal CL.

Input signals Pp and NP supplied, for example, by the circuit of FIG. 3, are received at input terminals 266 and 268 and are fed via inverters 270 and 272 to NAND gate 274 by which they pass to terminal D of a flip flop 276, the terminal C of which receives a 64 X clock signal. The output of flip flop 276 is a signal CMTDIN (standing for computer magnetic tape data in). This latter signal constitutes an input to terminal D of flip flop 278, the input terminal C of which receives a 64 X clock pulse. The positive output terminal 280 of flip flop 278 is a SYNDIN signal and the function of flip flop 278 is to provide for synchronization. The negative terminal of flip flop 278 is connected via line 282 to input terminal C of flip flop 250, the input terminal D of which receives a signal DN (standing for down) via terminal 284. The function of flip flop 250 is to decide whether the counter should count up or count down and to control or steer the 64 X clock pulse of line 312 to the UP or DN input of counter 256 according to signals appearing at terminals 286 and 288 and on lines 290 and 292. The bottom terminal B of flip flop 250 receives a signal via a line 294.

A flip flop 296 receives a 0 voltage signal at input terminal D and receives a signal from flip flop 278 at input terminal C via line 298. The output signals of flip flop 296 appears at terminals 300 and 302 which are the terminals at which idle and count signals are generated. The upper input terminal T of flip flop 296 receives an input signal via line 304. NAND gates 306 and 308 provide output signals connected to the up and down terminals of the counter 256. Gate 306 receives three input signals respectively from terminal 302 via a line 310 and from the 64 X clock source via a line 312 and from output 286 via line 290. Gate 308 receives three input signals respectively from line 292 from the 64 X clock source via line 312 and from count terminal 302 via line 310.

The counter 256, which is a commercially available up-down counter, provides an overflow signal at terminal 314 and an underflow signal at terminal 316. These signals are known as −OVRFL and −UNDFL respectively. −UNDFL is received at input terminal C of a flip flop 318 whose input terminal D is held at 0 volts. The aforenoted count signal is supplied to bottom input terminal B of flip flop 318 whose upper input terminal T is connected to the output of gate 306 via line 320. Output terminals 322 and 324 provide bit and -bit signals respectively.

A flip flop 326 receives an input signal ASTR at input terminal D and an input signal SYNDIN at input terminal C. Its bottom input terminal B receives an input signal from NAND gate 328, the input signals to which are a −64 X clock pulse received via terminal 330 and an STRO signal fed back via line 332 from output terminal 334 of flip flop 326 which is further provided with a negative output terminal 336 at which appears a −STRO signal. The −UNDFL signal generated by counter 256 is fed into an inverter 338 which produces an UNDFL signal at terminal 340.

A flip flop 342 receives a positive clamp voltage via input terminal D and an up signal via input terminal C, the latter said signal being an output of flip flop 250. The positive output of flip flop 342 is transmitted via line 346 to the clear terminals of count stages 258 and 260. The bottom input terminal B of flip flop 342 receives a signal from a NAND gate 348 which receives a −clock pulse at which input terminal 350 and a feedback signal from a flip flop 342 via line 352. The −clock signal is received from an inverter 354 which receives an input via line 312 and whose output terminal is indicated at 356.

The NAND gate 252 mentioned hereinabove transmits an output signal to the aforementioned inverter 254. Inputs to gate 252 are the −OVRFL signal which is received via a terminal 358 and a second signal received from a NAND gate 360. The inputs to gate 360 are the UNDFL signal which is received via terminal 362 and the −bit signal received via terminal 364.

The count signal mentioned hereinabove is fed via a terminal 366 as an input to a NAND gate 368 and the aforementioned DN signal is transmitted via terminal 370 as an input to gate 368 whose output signal is transmitted to an inverter 372 which produces the signal ASTR at terminal 374.

A PP of NP signal transmitted to the circuit of FIG. 7 will set flip flop 276 and generate the CMTDIN signal in response to the 64 X clock signal which was received by flip flop 276. The signal CMTDIN sets flip flop 278 upon receipt of the next 64 X clock signal. This produces a spike-free synchronized version of the input pulses.

As has been noted hereinabove, the original mode is idle. However, the setting of flip flop 278 operates through lines 282 and 298 to reset flip flop 296 by the lagging edge of the signal appearing on line 282. This produces a count signal at terminal 302, this deriving from the receipt of an input pulse PP which will be the first to arrive. At the same time, the signal up will be generated at terminal 286 on line 290 thereby priming gate 306. Additionally, UP, at C of flip flop 342 causes a positive pulse to occur on its output line 346 which clears counter 256 to an initial condition of zero count.

Subsequent 64 X clock pulses are then fed via line 312 and through gate 306 to the stages of counter 256 which is controlled to be in the count up state. Accordingly, a positively increasing binary count follows.

When the subsequent NP pulse arrives and is synchronized, the DN pulse is generated at terminal 288 and on line 292. Gate 308 is primed to pass the 64 X clock pulses received via line 312 and gate 306 is blocked. The stages of counter 256 are controlled to perform a count down operation and will do so until the counter is controlled to do otherwise.

The appearance of the next PP pulse results in producing the STRO signal at terminal 334. This tells the output to interpret the flip flop output bit which is at 1 unless the up-down counter 256 has gone below 0 and gives a signal at the −UNDFL line. The next count up pulse to the counter sets the bit signal again to the initial condition of "ON". Thus, capture of 0's or 1's are time independent (tape speed independent) as they are determined by the proportional or algebraic analyses provided by the up-down counter 256.

The process continues until there is reached the condition of underflow with the bit signal not on, thus signifying the maximum negative excursion of the count. This acts as an indication that the time between an NP and PP pulse has been too long and that this is the end of the block time out. This returns the logic to idle mode as can also be achieved by overflow when there is an excessive positive count.

The above circuitry is intended to show that the linear charged capacitor or analog embodiment of the invention can be replaced by an incremental or digital type of circuit as has been shown by way of illustration with respect to FIGS. 6 and 7.

The above circuits have been described with reference to reading and writing on a magnetic tape in the same direction for purposes of simplification of description. To read backwards it is only necessary to discard the end dummy data bit and to reinterpret the meaning of the intervals to conform with the technique applied. In other words, when reading back words, a long first interval will be interpreted as a 0 and not as a 1 when reading in forward direction. Also, unlike reading forward, the last thing seen is a clock so that the overflow will be positive.

From what has been described above, it will be seen that there is provided in accordance with the invention a data handling method in which data items such as 1's and 0's in a digital information signal are distinguished according to time results provided in different sequential periods in the signal. It will also be readily appreciated that since time ratios are employed, absolute time values lose significance so that the techniques and systems of the invention are substantially insensitive to the speed of the record medium (e.g., the magnetic tape) employed. Most important is that the speed of the medium needs to be reasonably constant only between successive PP pulses so that speed variations which occur slowly compared to these relatively short intervals are of no consequence. It will also be noted that the invention relates generally to the representation of data and need not be specifically limited to reading and writing circuitry. Finally, it will be evident that the techniques of the invention are applicable to other types of storage techniques such as, for example, photographic and electrostatic.

It will be generally noted that data items may be distinguished by the relative proportions of a time period occupied by respective levels of a signal system having at least two levels.

More specifically, the proportions relating to each specific data item or bit are sequentially arranged and cooperatively occupy, at least substantially, a complete period within which a data item or bit may be distinguished by the relationship of at least one of the corresponding proportions to a critical proportion.

There will now be obvious to those skilled in the art many modifications and variations of the structures and techniques discussed above. These modifications and variations will not however depart from the scope of the invention if defined by the following claims.

What is claimed is:

1. In a data handling system wherein bits of data are represented by signals in bit cells defined by displaced first and second transitions of a signal amplitude in a first direction and wherein the type of bit within a cell is defined by the position within a bit cell of a third transition of the signal amplitude in a second and opposite direction between said first and second transitions such that a first type of bit is represented when said third transition is closer to said first transition than said second transition and a second type of bit is represented when said third transition is closer to said second transition than said first transition, apparatus for identifying which type of bit is represented by the signal occurring within a bit cell comprising accumulating means for generating a first quantity related to the displacement between said first and third transition and storing said first quantity, deaccumulating means for generating a second quantity related to the displacement between said third and second transitions and subtracting said second quantity from said first quantity, and indicating means for indicating the type of bit as represented by the algebraic sign of the remainder resulting from the subtraction.

2. The apparatus of claim 1 wherein said accumulating means comprises a first current generator of a first polarity of current and a capacitor connected to said first current generator to receive current therefrom during the time between said first and third transitions, and said deaccumulating means comprises a second current generator of a second and opposite polarity of current which is connectable to said capacitor during the time between said third and second transitions.

3. The apparatus of claim 2 wherein said indicating means includes means for periodically sampling the voltage across said capacitor.

4. The apparatus of claim 3 further comprising means operable at times related to one of said first and second transitions for activating said periodic sampling means and discharging said capacitor.

5. The apparatus of claim 1 wherein said accumulating means comprises a first pulse source for generating pulses at a given repetition rate, a multi-position up-down counter and means for connecting said up-down counter to said first pulse source and energizing said up-down counter to count in an up direction during the time between said first and third transitions, and said deaccumulating means comprises a second pulse source for generating pulses at said given repetition rate and means for connecting said up-down counter to said second pulse source for energizing said up-down counter to count in a down direction during the time between said third and second transitions.

6. The apparatus of claim 5 wherein said indicating means includes an algebraic sign indicator position in said updown counter and means for periodically sampling the sign indicator position of said up-down counter.

7. The apparatus of claim 6 further comprising means operable at times related to one of said first and second transitions for activating said periodic sampling means and clearing said up-down counter.

8. Data handling apparatus comprising: first means responsive to a digital input to generate a signal consisting of a plurality of periods in each of which the time ratio between the transitions between signal levels indicates the digital value represented in such period, said first means including means for generating clock pulses which delineate said periods, means for generating sequenced pulses occurring in each said periods, means responsive to said clock pulses for generating one of said signal levels and responsive to said sequenced pulses for generating the other of said levels, and means responsive to said digital input to block one of the sequenced pulses;

second means for recording said signal as a series of rectangular pulses having leading and trailing edges; and third means for converting the thusly recorded signal into a further signal in which the presence and/or absence of pulses represents digital information including means for producing edge-defining pulses corresponding to said edges, quantity accumulating means, quantity generating means for increasing or decreasing the quantity accumulated in said quantity accumulating means in response to said edge-defining pulses, means for generating sample pulses in correspondence with said leading edges, and means for generating a digital signal dependent upon the magnitude of the accumulated quantity in said quantity accumulating means at the occurrence of said sample pulses.

9. The apparatus of claim 8 wherein said quantity accumulating means is chargeable means for accumulating charge and said quantity generating means includes means for transferring charge to and for said chargeable means.

10. Apparatus as claimed in claim 9 comprising means to generate pulses delayed with respect to said leading edges and means responsive to the thusly delayed pulses to prevent the generation of said digital signal in correspondence to the first of the sample pulses.

11. Apparatus as claimed in claim 10 comprising means responsive to the last two said means to set the chargeable means in an initial reference state.

12. The apparatus of claim 8 wherein said quantity accumulating means includes a pulse counter controllable to count upward or downward and said quantity generating means includes a timing pulse source connectable to said pulse counter and means for controlling said counter to count upward or downward in accordance with the sensing of a leading or trailing edge.

13. The apparatus of claim 12 further including means to clear said pulse counter at times related to the occurrence of said sampling pulses.

* * * * *

UNITED STATES PATENT OFFICE
CERTIFICATE OF CORRECTION

Patent No. 3,720,927 Dated March 13, 1973

Inventor(s) Edgar Wolf

It is certified that error appears in the above-identified patent and that said Letters Patent are hereby corrected as shown below:

Column 2, line 48: delete "In"

lines 49-53: cancel and rewrite as follows:

--The above discussion generally holds when recording the bits. However, when reading the bits it is best to define bit cells with no reference to time. A bit cell is defined as the region between first and second mutually displaced transitions of a signal amplitude in a first direction, while the type of bit stored in or represented by the cell is determined by a third transition of the signal amplitude in a second and opposite direction which occurs between the first and second transitions. The position of this third transition with respect to the first and second transitions determines the tupe of bit. For example, if the third transition is closer to the first transition the bit will be a "1" while if the third transition is closer to the second transition the bit will be a "0".

Now, if the two possible places within the cell where the second transition can occur are sufficiently displaced on either side of the halfway point of the cell, then the magnetic tape speed can vary over a wide range without creating any ambiguity when reading the bit cells according to the teaching of the invention, which basically measure a representation of the time between the first and third transition and subtracts from it a representation of a measure of the time between the third and second transitions. The type of bit that was recorded in a bit cell can then be indicated by the algebraic sign of the remainder resulting from such subtraction.--

UNITED STATES PATENT OFFICE

CERTIFICATE OF CORRECTION

Patent No. 3,720,927 Dated March 13, 1973

Inventor(s) Edgar Wolf

It is certified that error appears in the above-identified patent and that said Letters Patent are hereby corrected as shown below:

Column 6, line 49: after "140." insert --The combination of gated positive current source 140 and capacitor 146 can be considered to be an accumulating means.--

Column 6, line 51: after "142" insert--, a deaccumulating means--

Column 6, line 62: after "160." insert--The combination of comparator 152 and gate 154 can be considered to be an indicating means with gate 154 under control of the sample signal periodically sampling the output of comparator 152 which monitors the voltage across capacitor 146.--

Column 8, line 12: after "pulse." insert--The discharge signal operates (closes) bilateral switch 148 to discharge the capacitor 146. Thus, switch 148 driven by the discharge signal can be means for discharging the capacitor.--

Column 10, line 46: after "256." insert--NAND gates 306 and 308 can be considered as first and second pulse sources respectively.--

Column 10, line 56: after "316" insert--whih can be considered to be the algebraic signal indicator position of the counter.--

Signed and Sealed this

*tenth* Day of *February 1976*

[SEAL]

*Attest:*

RUTH C. MASON
*Attesting Officer*

C. MARSHALL DANN
*Commissioner of Patents and Trademarks*